United States Patent Office 2,872,113
Patented Feb. 3, 1959

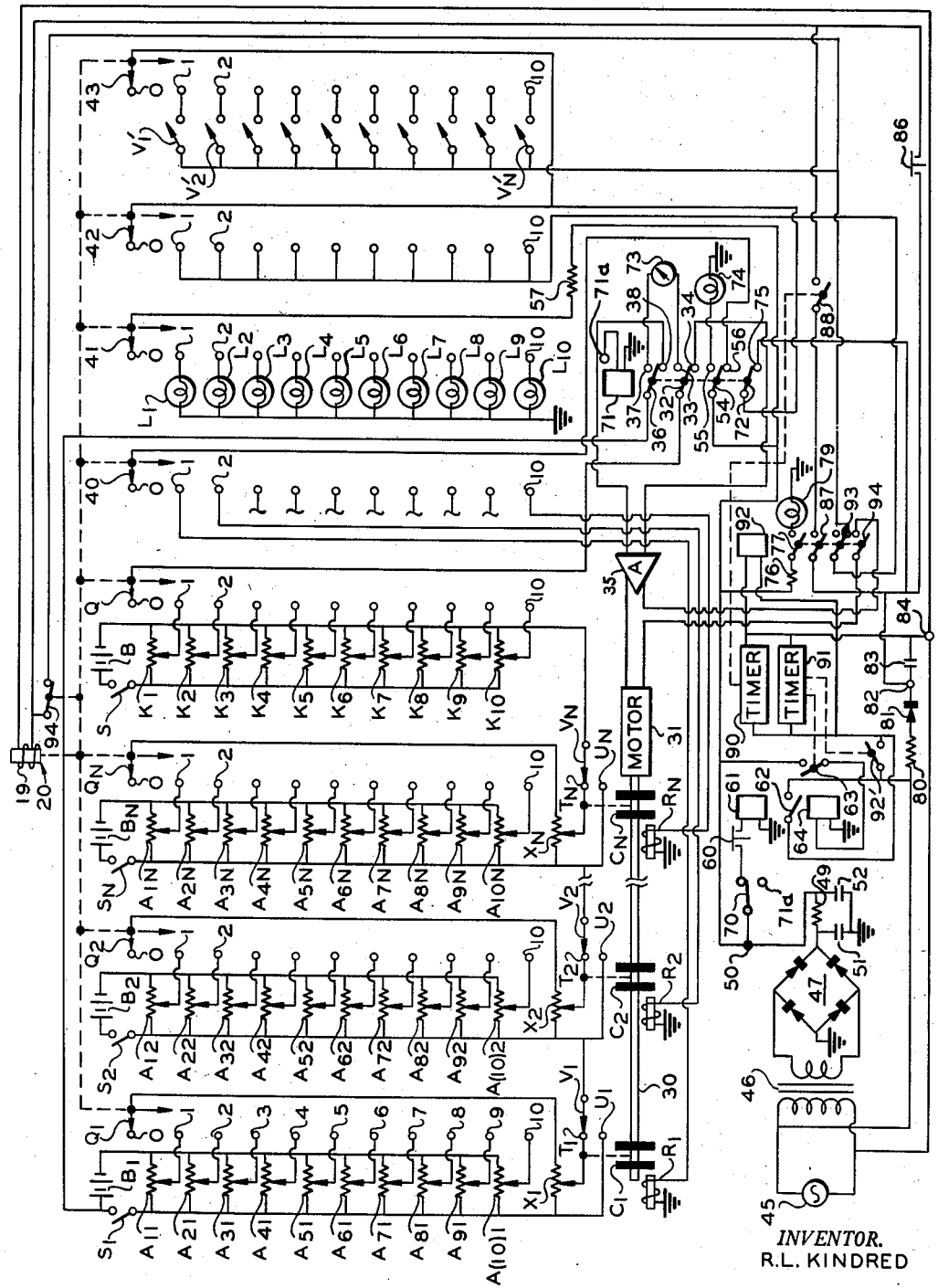

2,872,113

COMPUTER FOR SOLVING SIMULTANEOUS EQUATIONS

Raymond L. Kindred, Bartlesville, Okla., assignor to Phillips Petroleum Company, a corporation of Delaware Application May 24, 1956, Serial No. 587,038

8 Claims. (Cl. 235—61)

This invention relates to a computer for solving simultaneous equations.

The rapid solution of sets of simultaneous linear equations is of considerable importance in various industries. For example, the analysis of materials by infrared or mass spectroscopy often involves the solution of such equations. Elementary methods of elimination or substitution generally are not satisfactory for systems having more than four variables. While systems having more than four variables can be solved by methods of successive approximations, this procedure requires a considerable knowledge of mathematics and is often time consuming. For these reasons a number of computers have recently been developed to solve simultaneous equations by the Gauss-Siedel method of iteration. These computers generally employ a plurality of pairs of cascade connected potentiometers to perform the multiplication operations. The addition operations are performed by summing networks which are connected to current indicating devices to determine the condition of balance. The values of the known quantities are established on appropriate potentiometers and the balancing potentiometers are adjusted in succession until a solution is obtained. While computers of this type operate in a satisfactory manner, they often require a considerable period of time to determine the exact solution.

In accordance with the present invention there is provided a computer which operates automatically to solve simultaneous linear equations. The balancing potentiometers are adjusted sequentially by means of a servo motor which is energized in accordance with any difference between the summed voltages and the reference voltages. Timing means are provided to operate clutch means to connect the motor in sequence to the balancing potentiometers. The timing means also operates switching means to connect potentiometers representing the different equations to the input of the servo motor. In this manner the balancing operations are performed automatically and in considerably less time than is required with the prior art computers employing manually operated switches.

Accordingly, it is an object of this invention to provide an automatic computer for solving simultaneous linear equations.

Another object is to provide computing mechanism which is operated sequentially and automatically by a timing means.

Other objects, advantages and features of the invention should become apparent from the following detailed description, taken in conjunction with the accompanying drawing which is a schematic circuit diagram of the computer assembly.

The electrical computer of this invention is adapted to solve a general set of simultaneous equations of the form:

$$a_{11}x_1 + a_{12}x_2 + \ldots + a_{1n}x_n = k_1$$
$$a_{21}x_1 + a_{22}x_2 + \ldots + a_{2n}x_n = k_2$$
$$\vdots$$
$$a_{n1}x_1 + a_{n2}x_2 + \ldots + a_{nn}x_n = k_n$$

for the $x$ values, where the $a$ and the $k$ are constants. This set of equations can also be designated as follows:

$$\sum_{j=1}^{n} a_{ij}x_j = k_i \, (i=1 \text{ to } n, \text{ where } n \text{ is a positive integer})$$

The computer illustrated in the accompanying drawing is adapted to solve sets of simultaneous equations having as many as ten unknowns. It should be evident, however, that the invention is by no means restricted to this number because larger numbers of equations can readily be accommodated by adding additional networks which correspond to those illustrated. A first group of potentiometers $A_{11}$, $A_{21}$ ... $A_{(10)1}$ are connected in parallel with one another. A voltage source $B_1$ is applied across this group of potentiometers through a switch $S_1$. The contactors of potentiometers $A_{11}$, $A_{21}$ ... $A_{(10)1}$ are connected to respective contacts 1, 2 ... 10. These contacts, together with a contact $_0$, form the first bank of contacts of a stepping switch 20. A first switch arm $Q_1$ engages the eleven contacts in sequence when pulses are applied to the coil 19 of the stepping switch. Switch arm $Q_1$ moves from the zero contact downwardly to the tenth contact and then returns to the zero contact. The first end terminal of a potentiometer $X_1$ is connected to switch arm $Q_1$. The second end terminal of potentiometer $X_1$ is connected to switch $S_1$. The contactor of potentiometer $X_1$ is connected to a terminal $T_1$ which is adapted to be engaged by a switch $V_1$. Switch $S_1$ is connected to a terminal $U_1$ which also is adapted to be engaged by switch $V_1$.

The drive shaft 30 of a reversible servo motor 31 is connected by means of a clutch $C_1$ to the contactor of potentiometer $X_1$. Clutch $C_1$ is operated to make this connection whenever a coil $R_1$ is energized. Motor shaft 30 is disconnected from potentiometer $X_1$ when coil $R_1$ is de-energized.

Nine additional networks identical to the one previously described are provided in the computer. Switch $V_1$ is connected to switch $S_2$ of the second network. The additional V switches are connected to the adjacent networks in like manner.

A second group of potentiometers $K_1$, $K_2$ ... $K_{10}$ are connected in parallel with one another. A voltage source B is connected across these potentiometers through a switch S. The contactors of potentiometers $K_1$, $K_2$ ... $K_{10}$ are connected to respective stepping switch contacts 1, 2 ... 10 which are adapted to be engaged by switch arm Q. Switch $V_N$ is connected to the negative terminal of voltage source B. Switch arm Q is connected to a switch 32 which is adapted to engage a terminal 33 in the "up" position and a terminal 34 in the "down" position. Terminal 34 is connected to the first input terminal of a servo amplifier 35. The positive terminal of voltage source $B_1$ is connected to a switch 36 which is adapted to engage a terminal 37 in the "up" position and a terminal 38 in the "down" position. Terminal 38 is connected to the second input of servo amplifier 35. The first output terminal of amplifier 35 is connected to motor 31. The second output terminal of amplifier 35 is connected through a switch 94 to motor 31. Switch 94 is closed by a relay 92. Amplifier 35 can be of the type incorporating a chopper to convert direct current to alternating current which is amplified. Motor 31 can be a two phase induction motor.

Stepping switch 20 is provided with additional switch arms 40, 41, 42, and 43. The No. 1 contact associated with switch arm 40 is connected through coil $R_1$ to ground. Similarly, the contacts 2 . . . 10 which are associated with switch arm 40 are connected to ground through respective coils $R_2$ . . . $R_N$.

The switching mechanism of the computer is operated from a source of alternating current 45 which is applied across the primary winding of a transformer 46. The secondary winding of transformer 46 is connected across first opposite terminals of a full wave rectifier bridge 47. The third terminal of bridge 47 is connected through a filter resistor 49 to a terminal 50. The fourth terminal of bridge 47 is connected to ground. Filter capacitors 51 and 52 are connected between ground and the respective end terminals of resistor 49. A D. C. potential thus exists between terminal 50 and ground.

Terminal 50 is connected to a switch 54 which engages a terminal 55 in the "up" position and a terminal 56 in the "down" position. Terminal 56 is connected to switch arm 40. Terminal 50 is also connected through a resistor 57 to switch arm 41. Indicator lamps $L_1$, $L_2$ . . . $L_{10}$ are connected between ground and the respective contacts 1, 2 . . . 10 which are associated with switch arm 41. These lamps serve to indicate the positions of the switch arms of stepping swich 20. Potential terminal 50 is also connected through switches 70 and 60 and the coil of a relay 61 to ground. Relay 61 serves to close a switch 62. Relay 61 is the latching type so that switch 62 remains closed once the relay is energized. Terminal 50 is also connected through a switch 63 and the coil of a relay 64 to ground. When relay 64 is energized, the latching means associated with relay 61 is overcome so that switch 62 is opened. Terminal 50 is also connected through switch 70 and the coil of a relay 71 to ground. When relay 71 is energized, switches 36, 32, 54 and 72 are moved to corresponding "up" positions. A galvanometer 73 is connected between switch terminals 37 and 33. An indicating lamp 74 is connected between switch terminal 55 and ground. Switch 72 is connected to switch arm 42. In the illustrated "down" position, switch 72 engages a terminal 75. Terminal 50 is also connected through a resistor 76 to a switch 77 which is connected to ground through an indicating lamp 79 when closed.

The first terminal of voltage source 45 is connected through a resistor 80 to the first terminal of a rectifier 81. The second terminal of rectifier 81 is connected to a potential terminal 82. A capacitor 83 is connected between terminal 82 and a terminal 84 which is connected to the second terminal of voltage source 45. A second D. C. potential thus exists between terminals 82 and 84. Terminal 82 is connected through a switch 86 and stepping switch coil 19 to terminal 84. Terminal 82 is connected directly to switch terminal 75. Terminal 82 is also connected through a switch 87, a switch 88 and coil 19 to terminal 84.

The first terminal of voltage source 45 is connected through switch 62 to the first terminals of a timer 90, a timer 91 and the coil of a relay 92. The second terminals of timers 90 and 91 and the coil of relay 92 are connected to the second terminal of voltage source 45. Timer 90 can be a synchronous motor which has a cam on the drive shaft thereof that closes switch 88 periodically. Timer 91 can be a similar synchronous motor having cams on the driving shaft thereof which open and close switch 63 and a second switch 92' in the sequence described hereinafter. Switch 92' is connected between the first terminal of voltage source 45 and the first terminals of timers 90 and 91 and relay 92. When relay 92 is energized, switches 77 and 87 are closed and a switch 93 is opened. One terminal of switch 93 is connected to the contacts 1, 2 . . . 10 which are associated with switch arm 42. The second terminal of switch 93 is connected through an interrupter switch 94 and switch 86 to terminal 82. Interrupter switch 94 is opened momentarily each time the coil 19 of stepping switch 20 is energized.

The first step of operating the computer of this invention is to establish the $a$ and $k$ terms of the equations to be solved on the respective potentiometers. The K potentiometers are precision instruments provided with calibrated dials. The A potentiometers need not be calibrated. Coefficient $a_{11}$ is set on potentiometer $A_{11}$ by first adjusting the contactor of potentiometer $K_1$ to represent coefficient $a_{11}$. Switch 70 is moved to energize relay 71. This connects galvanometer 73 between the positive terminal of voltage source $B_1$ and switch arm Q. Switches $V_2$ . . . $V_N$ are connected to respective terminals $U_2$ . . . $U_N$. Switch $V_1$ is connected to terminal $T_1$. The contactor of potentiometer $X_1$ is moved to the right-hand position so as to be connected directly to switch arm $Q_1$. Switch 86 is closed momentarily to energize coil 19 to move switch arms Q and $Q_1$ into engagement with and their respective No. 1 contacts. All of the S switches are closed in unison. This results in the potential between the contactor and the right-hand terminal of potentiometer $K_1$ being connected in opposition to the potential between the contactor and the left-hand terminal of potential $A_{11}$. Galvanometer 73 indicates any difference between these two potentials. The contactor of potentiometer $A_{11}$ is then adjusted until any such potential difference is reduced to zero. The $a_{21}$ coefficient can then be set on potentiometer $A_{21}$ by setting the value $a_{21}$ on potentiometer $K_2$. Switch 86 is again depressed to move the arms of the stepping switch to the No. 2 contacts. The balancing operation is then repeated by adjusting the contactor of potentiometer $A_{21}$. The remaining coefficients are set on the first group of A potentiometers in the same manner.

The contacts 1, 2 . . . 10 associated with switch arm 43 are connected through respective switches $V_1'$, $V_2'$ . . . $V_N'$ to the lower contact of switch 93. Switch arm 43 is connected to switch 72. Switches $V_1$, $V_2$ . . . $V_N$ are connected with respective switches $V_1'$, $V_2'$ . . . $V_N'$ so that the latter are opened when the former engage respective T terminals. The $a$ coefficients can be set on the second group of A potentiometers by moving switch $V_2$ into engagement with terminal $T_2$ and moving $V_1$ into engagement with terminal $U_1$. In a corresponding manner, all of the $a$ coefficients are set on the respective A potentiometers. The $k$ constants are finally set directly on the respective K potentiometers. Switch 70 is then opened to deenergize relay 71 and to connect switch 60 to terminal 50.

The computer is set in operation by closing switch 60 momentarily. This results in relay 61 being energized so that switch 62 locks in a closed position. Closure of switch 62 energizes timers 90 and 91 and relay 92. Timer 90 closes switch 88 momentarily once every five seconds. The first closure of switch 88 energizes coil 19 so that the switch arms move from the illustrated zero contacts to the No. 1 contacts. In this position, a voltage representing the quantity $(a_{11}x_1 + a_{12}x_2 + \ldots + a_{1n}x_n)$ is connected in opposition with the voltage across optentiometer $K_1$ representing $k_1$. Any difference between these two voltages results in an error signal being applied to the input of amplifier 35. This error signal drives motor 31 in a direction so as to move the contactor of potentiometer $X_1$ to tend to reduce the error signal. It should be noted that coil $R_1$ is energized at this time so that the drive shaft 30 of motor 31 is connected through clutch $C_1$ to the contactor of potentiometer $X_1$. It has been found that five seconds is ample to minimize any error voltage. At the end of the first five seconds, switch 88 is again closed by timer 90 so that the switch arms are moved into engagement with the No. 2 contacts. The balancing operation by motor 31 is then repeated. However, coil R₂ is energized so that the motor 31 adjusts potentiometer X₂. This switching operation and adjustment of potentiometers is repeated in cycles until the error voltages are substantially zero at all positions.

It has been found that a time interval of ten minutes is ample to obtain a condition of balance with the illustrated ten groups of potentiometers if the computer is operated automatically. Timer 91 is employed to permit the operation to continue the full ten minutes. At some time during this ten minutes period, timer 91 closes switch 63. Closure of switch 63 energizes relay 64 to open switch 62. However, the timers and relay 92 remain energized through switch 92. At the end of the ten minute period, timer 91 opens switch 92 to discontinue the operation. Switch 94 disconnects motor 31. The speed of operation can be increased by manually operating swich 86 each time a channel is balanced.

If the stepping switches are at psitions other than the zero contacts at the end of the operation, coil 19 is energized through switch arm 42 and its associated contacts to return the switch arms to the zero positions. This connection is made through switches 72 and 93.

It should be evident that this computer can readily be employed to solve equations having fewer than ten unknown quantities. The potentiometer networks not required can readily be by-passed by moving the V switches into engagement with the corresponding U contacts and closing the corresponding V' switches. As previously mentioned, the computer can be employed to solve sets of equations having more than ten unknown quantities by adding more groups of A potentiometers and increasing the number of K potentiometers and stepping switch contacts. It should be evident that the computer greatly reduces the time required in solving sets of simultaneous equations because the switching and balancing operations are performed automatically and at a higher rate of speed than can be maintained by an operator.

While the invention has been described in conjunction with a present preferred embodiment, it should be evident that it is not limited thereto.

What is claimed is:

1. A computer for solving a set of equations of the form $$\sum_{j=1}^{n} a_{ij}x_j = k_i$$

for the values of $x$, where the $a$ and $k$ are constants and $i$ varies from one to $n$, $n$ being a positive integer greater than one, comprising: $n$ groups of $n$ first potentiometers, the potentiometers in each group being connected in parallel, means applying first potentials across each of said groups of first potentiometers, $n$ second potentiometers connected in parallel with one another, means applying a second potential across said second potentiometers, $n$ third potentiometers, switching means to connect each of said third potentiometers selectively in cascade with the individual first potentiometers in respective ones of said groups, means to sum the voltages between the contactors and respective first end terminals of said third potentiometers, a reversible motor, $n$ clutch means to connect said motor selectively to the contactors of said third potentiometers to adjust same, voltage comparing means to energize said motor responsive to a difference between the output of said means to sum and the voltage between the contactor and a first end terminal of one of said second potentiometers, and timing means to energize said switching means and said clutch means periodically so that the summed voltage is sequentially compared with the voltage from a corresponding one of said second potentiometers for preselected time intervals established by said timing means.

2. The combination in accordance with claim 1 wherein said switching means comprises a stepping switch having $n$ first switch arms to connect said third potentiometers in cascade with the first potentiometers, a second switch arm to connect said second potentiometers to said voltage comparing means in sequence, and a third switch arm to energize said clutch means in sequence.

3. The combination in accordance with claim 1 further comprising a current indicating device, and switching means to connect said device to said voltage comparing means in place of said motor.

4. A computer for solving a set of equations of the form $$\sum_{j=1}^{n} a_{ij}x_j = k_i$$

for values of $x$, where the $a$ and $k$ are constants and $i$ varies from one to $n$, $n$ being a positive integer greater than one, comprising: $n$ groups of $n$ first potentiometers, the potentiometers in each group being connected in parallel, means applying first potentials across each of said groups of first potentiometers, $n$ second potentiometers connected in parallel with one another, means applying a second potential across said second potentiometers, $n$ third potentiometers having the first terminals thereof connected to corresponding first end terminals of respective ones of said $n$ groups of $n$ first potentiometers, a stepping switch having $n$ first movable arms connected to second end terminals of respective ones of said third potentiometers, said stepping switch having $n$ groups of $(n+1)$ first contacts, the contactors of said first potentiometers being connected to respective ones of said first contacts, $(n+1)$ second contacts associated with said stepping switch, a second movable arm adapted to engage said second contacts, the contactors of said second potentiometers being connected to respective ones of said second contacts, a reversible motor, $n$ clutch means to connect the drive shaft of said motor to respective ones of said third potentiometers to adjust same, $(n+1)$ third contacts associated with said stepping switch, a third movable arm adapted to engage said third contacts, $n$ means including a respective one of said third contacts to actuate respective ones of said clutch means when said third arm is in engagement with the associated third contact, means connecting the contactors of all but one of said third potentiometers to the first end terminal of an adjacent third potentiometer, means connecting the contactor of said one third potentiometer to first end terminals of said second potentiometers, motor actuating means to drive said motor, means connecting said third arm to one input of said motor actuating means, means connecting the first end terminal of the third potentiometer to which another third potentiometer is not connected to the second input of said motor actuating means, and timing means to energize said stepping switch periodically to move said arms to adjacent contacts.

5. The combination in accordance with claim 4 further comprising second timing means to permit said first timing means to be energized for a predetermined period of time, and means to return said arms of said stepping switch to the non-connected contacts at the end of said period.

6. The combination in accordance with claim 4 further comprising $n$ switch means to permit the first end terminals of the first potentiometers to be connected directly to the first end terminals of the first potentiometers of adjacent groups thereof.

7. In a computer having a plurality of impedance networks including means for producing voltage drops across said networks, a plurality of reference voltages, and a plurality of balancing impedances selectively connected in circuit with said impedance networks; improved means for equalizing the combined voltage drops across said networks and said balancing impedances with said reference voltages comprising a reversible motor, means for energizing said motor responsive to an error voltage which is the difference between said combined voltage drop and said reference voltage from one network, clutch means to connect said motor selectively to said balancing impedances, timing means, and means responsive to said timing means to actuate said clutch means and to connect said reference voltages selectively to said means for energizing.

8. The combination in accordance with claim 7 wherein said means to connect includes a stepping switch, and wherein said timing means energizes said stepping switch periodically.

References Cited in the file of this patent
UNITED STATES PATENTS

| | | |
|---|---|---|
| 2,468,150 | Wilcox | Apr. 26, 1949 |
| 2,584,809 | Oberlin | Feb. 5, 1952 |
| 2,613,032 | Serrell et al. | Oct. 7, 1952 |

OTHER REFERENCES

A Simple Analogue Computer for Fourier Analysis and Synthesis (Bowen), Electronic Engineering, February 1951, pages 67–69.

Electronic Correlator for Solving Complex Signalling Parameters (Cheatham), Tele-Tech, February 1950, page 41.